United States Patent [19]

Takahashi et al.

[11] Patent Number: 5,173,819
[45] Date of Patent: Dec. 22, 1992

[54] DISK APPARATUS HAVING AN IMPROVED COOLING STRUCTURE

[75] Inventors: Tsuyoshi Takahashi; Kazuo Nakagoshi; Jun Naruse; Takuji Ogawa, all of Odawara; Takeo Hayakawa, Kanagawa, all of Japan

[73] Assignee: Hitachi, Ltd., Tokyo, Japan

[21] Appl. No.: 733,008

[22] Filed: Jul. 19, 1991

Related U.S. Application Data

[63] Continuation of Ser. No. 415,987, Oct. 2, 1989, abandoned.

[30] Foreign Application Priority Data

Oct. 5, 1988 [JP] Japan .................................. 63-249885

[51] Int. Cl.⁵ ............................................. G11B 33/14
[52] U.S. Cl. .................................. 360/97.03; 165/80.3
[58] Field of Search .............. 360/97.02, 97.03, 97.04, 360/98.01; 369/75.1; 174/15.1, 16.1, 17 VA; 361/384, 383; 165/80.3

[56] References Cited

U.S. PATENT DOCUMENTS 5,041,931  8/1991  Uno et al. .................. 360/97.03

FOREIGN PATENT DOCUMENTS

| 0073009 | 6/1977 | Japan | 360/97.02 |
| 0063990 | 4/1986 | Japan | 360/97.02 |
| 0239394 | 10/1987 | Japan | 360/97.03 |
| 0243173 | 10/1987 | Japan | 360/97.02 |
| 0271284 | 11/1987 | Japan | 360/97.02 |

OTHER PUBLICATIONS

IBM Technical Disclosure Bulletin vol. 19 No. 10 Mar. 1977 Low-cost, rack-mounted, direct-access disk storage device, Bakken et al.

Primary Examiner—Andrew L. Sniezek
Attorney, Agent, or Firm—Kenyon & Kenyon

[57] ABSTRACT

An electronic apparatus, such as a disk apparatus, has a plurality of electronic units such as magnetic head-disk units and at least one power source unit for supplying power to the electronic units. The arrangement of the electronic apparatus is such that, on a frame of the apparatus, the plurality of electronic units are vertically arranged in such a manner as to form a first arrangement system, while the at least one power source unit is arranged in such a manner as to form a second arrangement system above the first arrangement system. The apparatus has an air flow passage for causing cooling air to flow from a lower portion of the electronic apparatus to the inside thereof, pass through the first arrangement system, thereby pass through the second arrangement system, and then be discharged to the outside of the apparatus. This arrangement enables cooling air to flow in a simplified manner, which in turn enhances the cooling efficiency, and also enables electrically connecting cables to be arranged in a simple wiring system.

3 Claims, 10 Drawing Sheets

DISK APPARATUS HAVING AN IMPROVED COOLING STRUCTURE

This application is a continuation, of application Ser. No. 07/415,987, filed Oct. 2, 1989, now abandoned.

BACKGROUND OF THE INVENTION

The present invention relates to disk apparatuses. More specifically, it relates to the arrangement of the each of units constituting a magnetic disk apparatus used as, e.g., an external storage for a computer, and a structure for cooling these units.

Magnetic disk apparatuses which have recently come into use are generally arranged in such a manner that, in order to attain a large capacity, each apparatus is constructed as an aggregate-type magnetic disk apparatus in which a plurality of head-disk assemblies (hereinafter abbreviated to "HDAs") are accommodated in one casing.

Apparatuses of this type include, for example, the apparatus known from "Nippon Telegraph and Telephone Public Corporation, Report on Researches and Ways of Application" (pages 313 to 315, Vol. 31, No. 1, 1982) in which, eight HDAs (referred to as disk enclosures (DEs) in this document) are mounted within one casing. According to this document, also mounted in the casing are four electronic circuit sections each capable of simultaneously controlling two HDAs, and four power sources each corresponding to one of the electronic circuit sections.

When the apparatus is observed from the functional viewpoint, two HDAs, one electronic circuit section for controlling these HDAs, and one power source together constitute one unit. On the whole, therefore, four sets, each set comprising one unit, are mounted in the casing. The inside of the casing is provided with four shelves on which the units are disposed one by one.

This arrangement of the conventional apparatus calls for a certain wiring arrangement. That is, lines must be extended horizontally to allow electrical connection from the power sources to the corresponding electronic circuit sections, and from these electronic circuit sections to the associated HDAs. Furthermore, interface cables extending vertically from a host apparatus (string controller) must be connected to each of the electronic circuit sections.

Various devices of the apparatus, such as the power sources, are cooled by air. Because power sources normally require cooling fans to be provided in correspondence therewith, it is assumed that each of the four power sources is provided with a corresponding fan and is cooled thereby, and that each of the four electronic circuit sections is also cooled by one cooling fan. All of the eight HDAs are cooled by air caused to flow by a fan from the lower portion to the upper portion of the casing. In addition, a plurality of fans are provided on the upper portion of the casing so as to discharge the air heated within the casing.

Each HDA accommodates therein a magnetic head for writing information thereon and reading information therefrom. In this connection, it is particularly desired that the magnetic head should be positioned on the associated magnetic disk medium with only a very small deviation involved. If the HDA is cooled to an inadequate extent, this results in an increase in the temperature of the HDA, thereby leading to an increase in the deviation in positioning the magnetic head due to the thermal expansion of various component parts of the HDA. Therefore, it is of importance that HDAs be cooled as adequately as possible and that any rise in the temperature of the HDAs be prevented. With respect to the electronic circuit sections, it is of importance that they be cooled adequately so that none of the allowable temperature ranges of their various circuit elements are exceeded.

With the above-described prior art, since each of the power sources and the electronic circuit sections is provided as enclosed within its own box, it is necessary to provide at least one cooling fan in correspondence with each of these devices. The entire apparatus therefore requires a large number of fans to be provided, thereby inevitably complicating the cooling system within the casing.

Furthermore, the arrangement of the conventional apparatus is such that a plurality of units, each comprising one power source, one electronic circuit section, and two HDAs, are independently disposed within the casing, while horizontally extending cables allow in-unit electrical connections and interface cables vertically extend from a host apparatus to each of the electronic circuit sections. Thus, the apparatus has a complicated wiring arrangement with various lines extending criss-cross, thereby often resulting in the occurrence of errors during maintenance operations for the devices within the casing, and an increase in the period of time required for these maintenance operations.

SUMMARY OF THE INVENTION

The present invention provides an arrangement of an electronic apparatus in which a plurality of electronic units and at least one power source unit are disposed, the arrangement enabling the units to be disposed efficiently.

The present invention further provides an arrangement of a disk apparatus in which a plurality of head-disk units and at least one power source unit are disposed, the arrangement enabling the units to be disposed efficiently, and ensuring an enhanced level of cooling efficiency.

Additionally, the present invention provides a cooling structure of a disk apparatus having a plurality of head-disk units, the structure enabling cooling air to flow in a simplified manner, and ensuring an enhanced level of cooling efficiency.

Furthermore, the present invention provides a cooling structure of a head-disk unit that enables a plurality of head-disk assemblies of the unit, and that section of the unit which is provided with a printed circuit board where electronic component parts for controlling the assemblies are mounted, to be individually cooled by flows of air belonging to different air flow systems.

Still furthermore, the present invention provides an arrangement of a cable system of a disk apparatus on which a plurality of head-disk units are mounted, the arrangement enabling electrical cables to be connected to various component units of the apparatus in a simplified manner.

In an electronic apparatus, such as a magnetic disk apparatus, according to the present invention, a plurality of electronic units are regularly arranged, and at least one power source unit for supplying power to the plurality of electronic units is arranged above an arrangement system formed by the electronic units. Specifically, within a casing of the apparatus, e.g., the magnetic disk apparatus, eight electronic units, e.g., eight head-disk units (hereinafter abbreviated to "HDUs"), are mounted while they form two vertical columns and four layers, and two power source units are disposed above the structure formed by these HDUs. The apparatus has power supply cables provided in such a manner that one of the power source units is able to supply power to those four HDUs vertically arranged below that one power source unit. In other words, the power supply cables are provided in two vertically extending lines.

According to the present invention, a head-disk unit comprises a head-disk assembly (hereinafter abbreviated to an "HDA") including a plurality of magnetic disks, a plurality of magnetic heads for writing information on and reading information from the magnetic disks, and a drive section for driving the magnetic heads, and also comprises a group consisting of a plurality of printed circuit boards (hereinafter abbreviated to "PCBs") on which electronic circuit elements for controlling the HDA are mounted. When the HDU is observed from the viewpoint of mounting, it has a first chamber and a second chamber partitioned by a wall, the first chamber accommodating the HDA, and the second chamber accommodating the group of PCBs. Each of the first and second chambers partially opens in such a manner that air passes in the to-and-fro direction through the first chamber, and in the up-and-down direction through the second chamber. The HDA within the first chamber is cooled by a horizontal flow of air in the to-and-fro direction, and the PCB within the second chamber is cooled by a vertical flow of air in the up-and-down direction. With the above-described arrangement, if the electronic circuit elements are mounted on two PCB members, and simultaneously if these two PCB members are disposed in such a manner that their respective surfaces on which the electronic circuit elements are mounted face each other and the two PCB members serve in effect as a pair of side walls of the second chamber, it is possible to effect more effective cooling of the electronic circuit elements, while the mounting structure of the HDU is simplified.

According to the present invention, a magnetic disk apparatus has a casing with a certain shelf structure in which a vertically extending partition wall is provided in such a manner as to bisect the casing into left and right sides, and in which four HDUs are mounted on each of the left and right sides. The apparatus includes cooling fans provided, as ventilation means, at positions each corresponding to the HDAs of those HDUs mounted on one of the shelves of the casing. When all the HDUs are mounted on the casing, air flow passageways are formed horizontally in correspondence with the fans and in such a manner as to surround the HDAs. In the condition where all the HDUs are mounted within the casing, the second chambers of four vertically-arranged HDUs have their upper and lower openings for the passage of air mutually aligned, i.e., the lower opening of one HDU aligns with the upper opening of an adjacent HDU, etc. Therefore, if ventilation is effected in the vertical direction, it is possible to cool, en bloc, the electronic circuit elements mounted on the PCBs of all four HDUs.

According to the present invention, the cable distribution system of the apparatus is such that a wiring structure, such as that described before, connects the at least one power source with each of the HDUs and comprises power supply cables all extending in the vertical direction and are assembled. Also in the cable distribution system, interface cables for transmitting control signals and information are connected to the PCBs of the HDUs while they extend beside the power supply cables, so that the interface cables all extend in the vertical direction and are assembled. In this way, since all the power supply cables and the interface cables extend in the vertical direction and are assembled together in bundles, the cable distribution system is simplified.

DETAILED DESCRIPTION

Certain embodiments of the present invention will now be described in detail with reference to the drawings.

Figure 2:
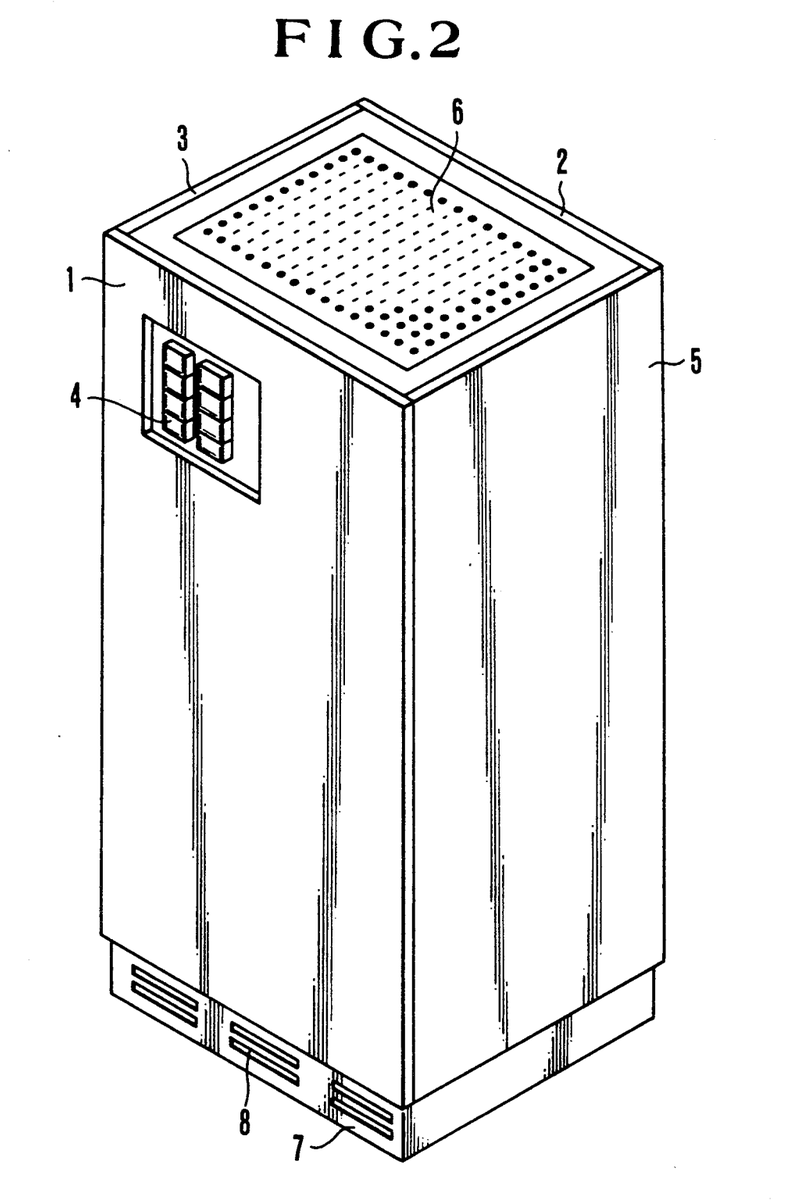
FIG. 2 is a perspective view of the magnetic disk apparatus shown in FIG. 1, showing the external appearance thereof.

FIG. 2 is a perspective view showing the external appearance of a magnetic disk apparatus in accordance with one embodiment of the present invention. An operator control panel 4 is mounted on a front door 1 forming the front face of the magnetic disk apparatus. Switches and the like are provided on the operator control panel 4 and enable the operations of, for instance, starting and stopping the magnetic disk apparatus. A rear door 2 is provided to form the rear face of the apparatus, and is able to be opened and closed. When required, e.g., when maintenance operations for the apparatus are to be performed, the rear door 2 as well as the front door 1 are opened to allow the necessary operations to be performed. Side covers 3 and 5 are provided to form the side faces of the magnetic disk apparatus. When a plurality of magnetic disk apparatuses, each being such as that described above, are to be arranged side by side, the side covers 3 and 5 of the apparatuses are removed, and the apparatuses are laterally arranged close together. The apparatus has, as its component units, electronic units, etc. disposed therein, and, in order to cool these units, ventilation is effected.

For this purpose, air inlets 8 are formed in a skirt 7 at the lower portion of the apparatus. Air used to cool the electronic units, etc. within the apparatus is discharged through holes formed in a top cover 6 at the uppermost portion of the apparatus. The top cover 6 is formed with a large number of through holes having a diameter of about 3 mm.

Figure 1:
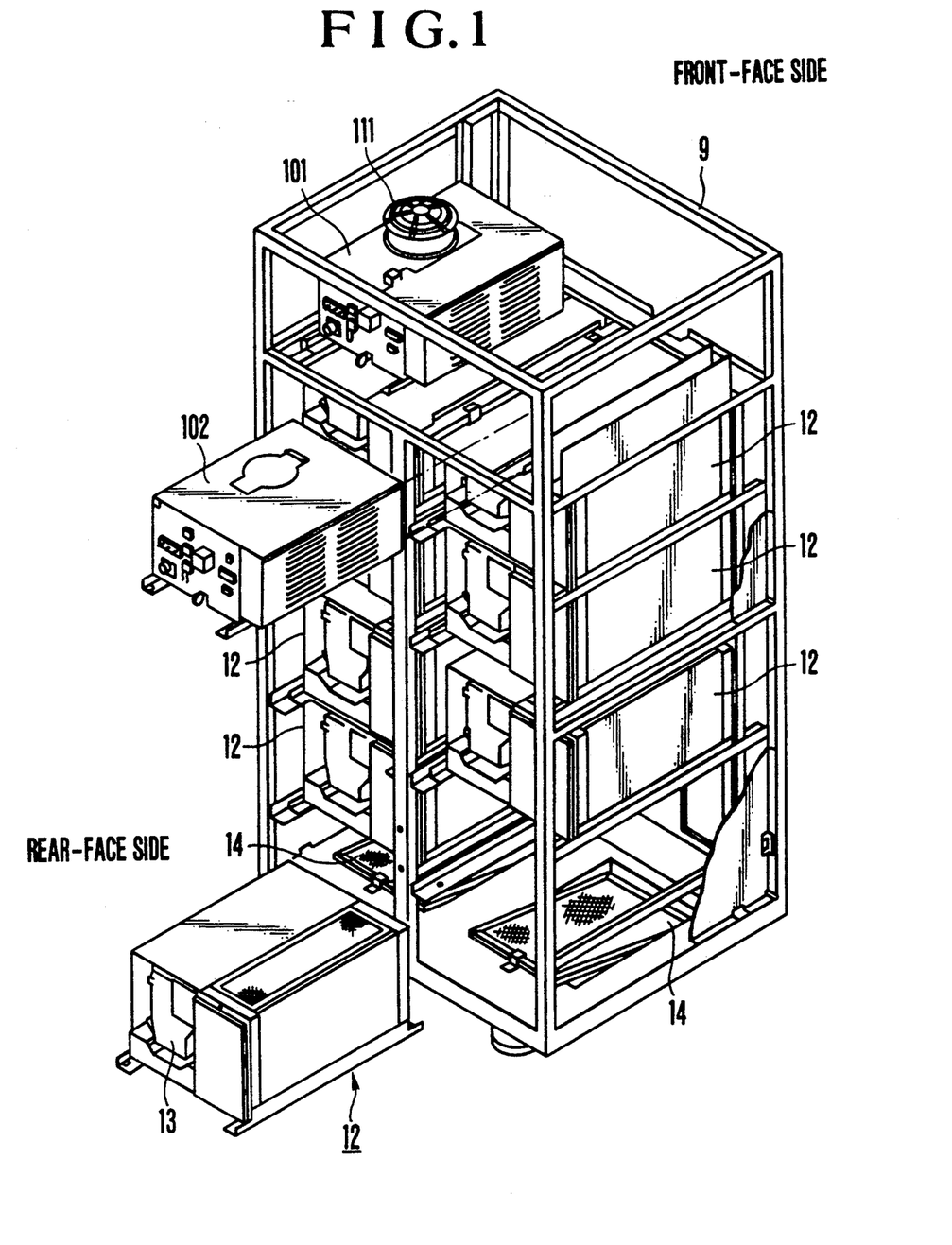
FIG. 1 is a perspective view of a magnetic disk apparatus in accordance with one embodiment of the present invention, showing the state where the component units of the apparatus are mounted.
Figure 7:
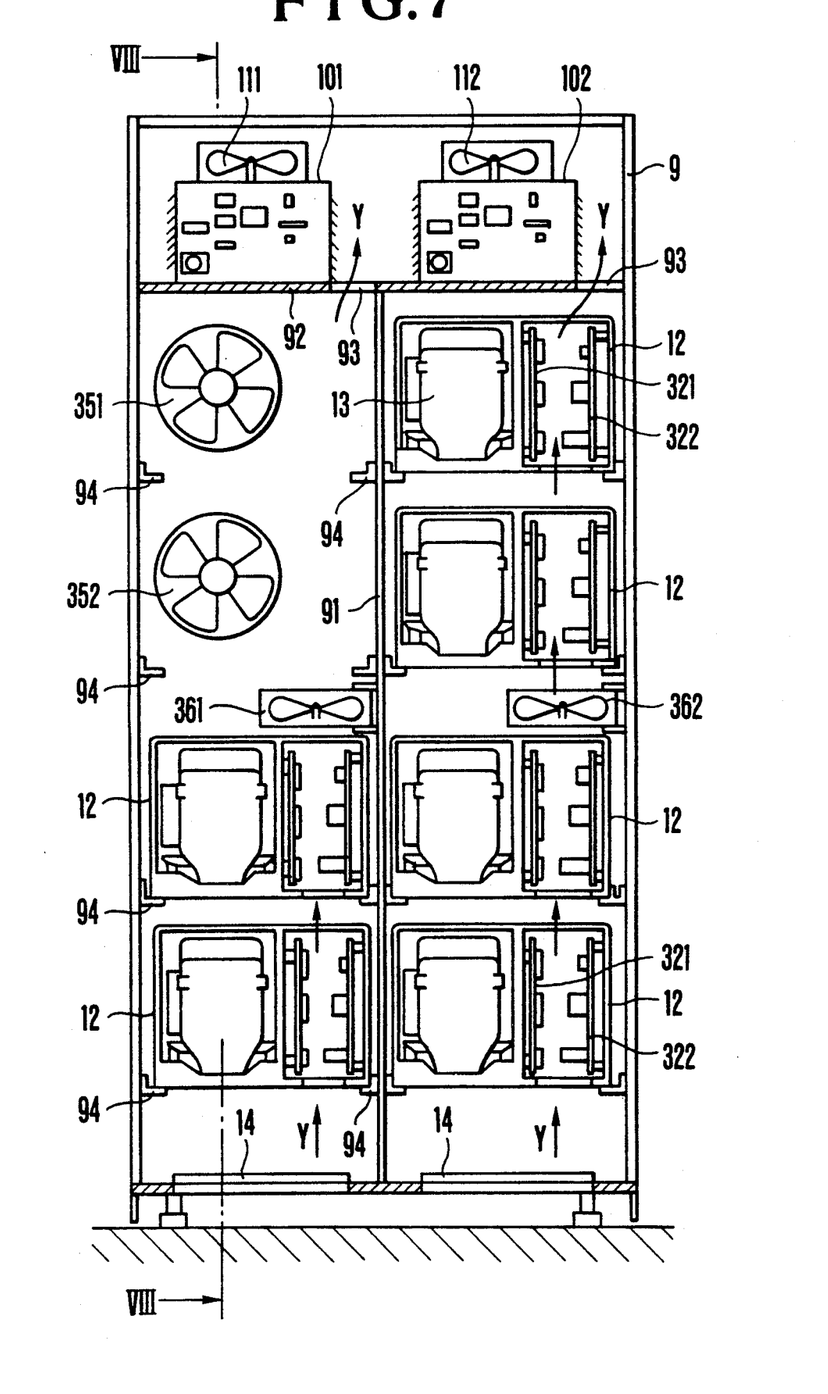
FIG. 7 is an elevation of the magnetic disk apparatus, taken from the rear-face side thereof.

FIG. 1 shows the state in which the component units of the magnetic disk apparatus shown in FIG. 2 are mounted. The figure is a perspective view taken from an obliquely rearward position while the front door 1, the rear door 2, the side cover 3, the top cover 6, and the skirt 7 are removed to enable direct observation of the inside of the apparatus. The apparatus has a frame 9 which is in turn provided with five shelves so that electronic units may be mounted within the apparatus. The component units of the apparatus include two power sources 101 and 102 disposed on the uppermost shelf of the frame 9. In the FIG. 1, one of the power sources 101 is shown as being disposed on the shelf of the frame 9, while the other 102 is shown immediately before its mounting on the shelf. Cooling fans 111 and 112 are provided on the respective upper portions of the power sources 101 and 102, the illustration of the fan 112 associated with the power source 102 shown as being immediately before its mounting on the frame 9 is omitted (FIG. 7 shows both fans 111 and 112). The four shelves which are below the shelf on which the power sources 101 and 102 are mounted are partitioned by a wall into two columns on the left and right sides. Each of the four shelves allows two head-disk units (HDUs) 12 to be mounted thereon, one on the left and one on the right side, so that eight HDUs 12 in total may be mounted. The HDU 12 corresponding to the right side of the lowermost shelf is shown immediately before its mounting on the shelf of the frame 9. At the lowermost portion of the frame 9, two air filters 14 are provided on the left side and the right side, so that air sucked from a space below the frame 9 is filtered by the filters 14 before it is sent to the inside of the apparatus.

The foregoing descriptions are concerned with a certain structure of the magnetic disk apparatus of the present invention which is provided to mount the component units, such as the electronic units. Next, a cooling structure and a cable distribution structure of the apparatus, as well as the structure of the HDUs will be described in detail.

Figure 3:
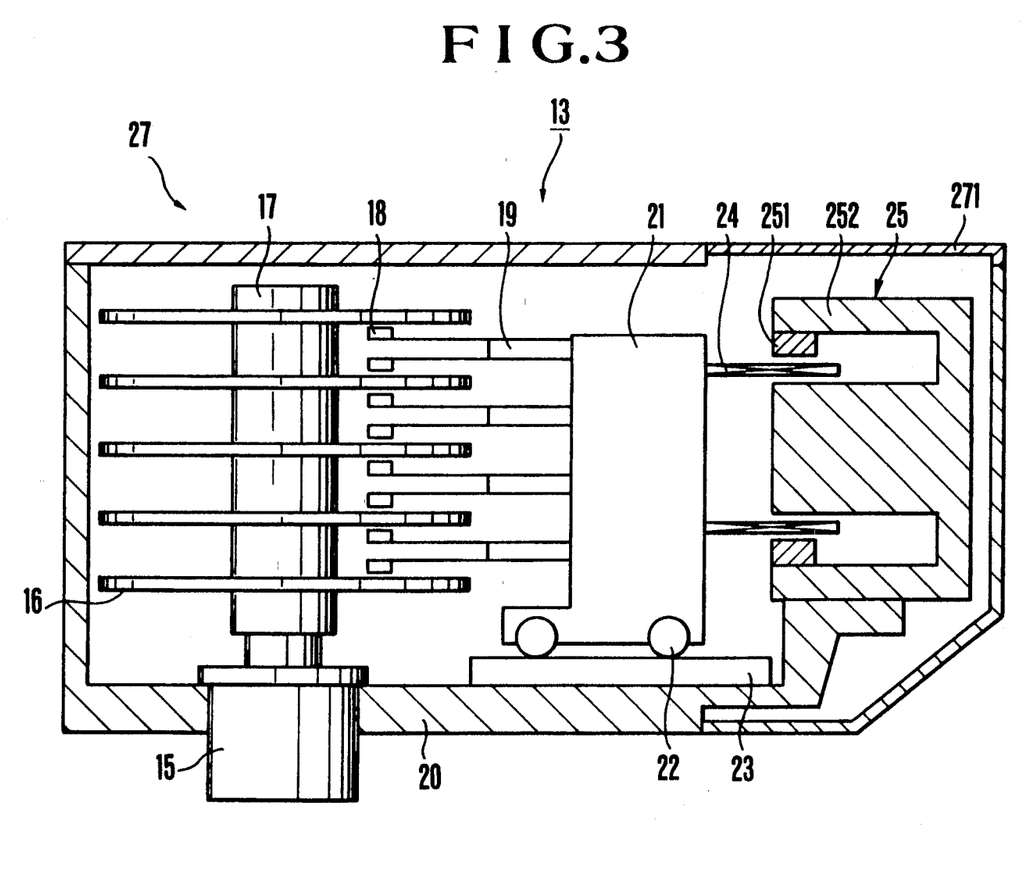
FIG. 3 is a sectional view of a head-disk assembly (HDA).

FIG. 3 is a sectional view showing the structure of a head-disk assembly (HDA) 13. Each of the HDUs, having a structure which will be described later in detail with reference to FIG. 5, has two chambers, one for accommodating an HDA 13, and the other for accommodating PCBs on which electronic circuit elements for controlling the HDA 13 are mounted. Descriptions will first be given concerning the structure of each of the HDAs 13.

As shown in FIG. 3, each HDA 13 mainly comprises a housing 27, a structure formed by magnetic disks, magnetic heads, and means for driving the magnetic heads, the magnetic disk structure, the magnetic heads, and the magnetic head drive means being accommodated within the housing 27. A plurality of magnetic disks 16 are fixed to a spindle 17 whose lower end (as viewed in FIG. 3) is directly connected to a motor 15 so as to rotate when driven by the motor 15. The motor 15 is fixed to a base 20. A plurality of magnetic heads 18 are provided to record information on and reproduce information from the magnetic disks 16, and are each supported by a head arm 19. The head arms 19 are fixed to a carriage 21. The carriage 21 is supported by ball bearings 22 in such a manner as to be linearly movable in the radial direction of the magnetic disks 16. The ball bearings 22 are in turn guided by a rail 23 fixed to the base 20. Coils 24 are mounted on that side of the carriage 21 which is remote from the magnetic disks 16. Disposed on the periphery of the coils 24 is a magnetic circuit 25 provided with permanent magnets 251 and yokes 252 and mounted on the base 20. The coils 24 and the magnetic circuit 25 form the so-called voice-coil motor (hereinafter abbreviated to "VCM") in which, when current flows through the coils 24, thrust is generated by the coils 24. The above-described structure drives the magnetic heads 18 in a horizontal direction until the heads 18 are positioned at target tracks of the magnetic disks 16 being rotated by the motor 15. The positioning is performed through servo control. When the magnetic heads 18 are properly positioned, they act to write information on the magnetic disks 16 or to read information therefrom.

Figure 4:
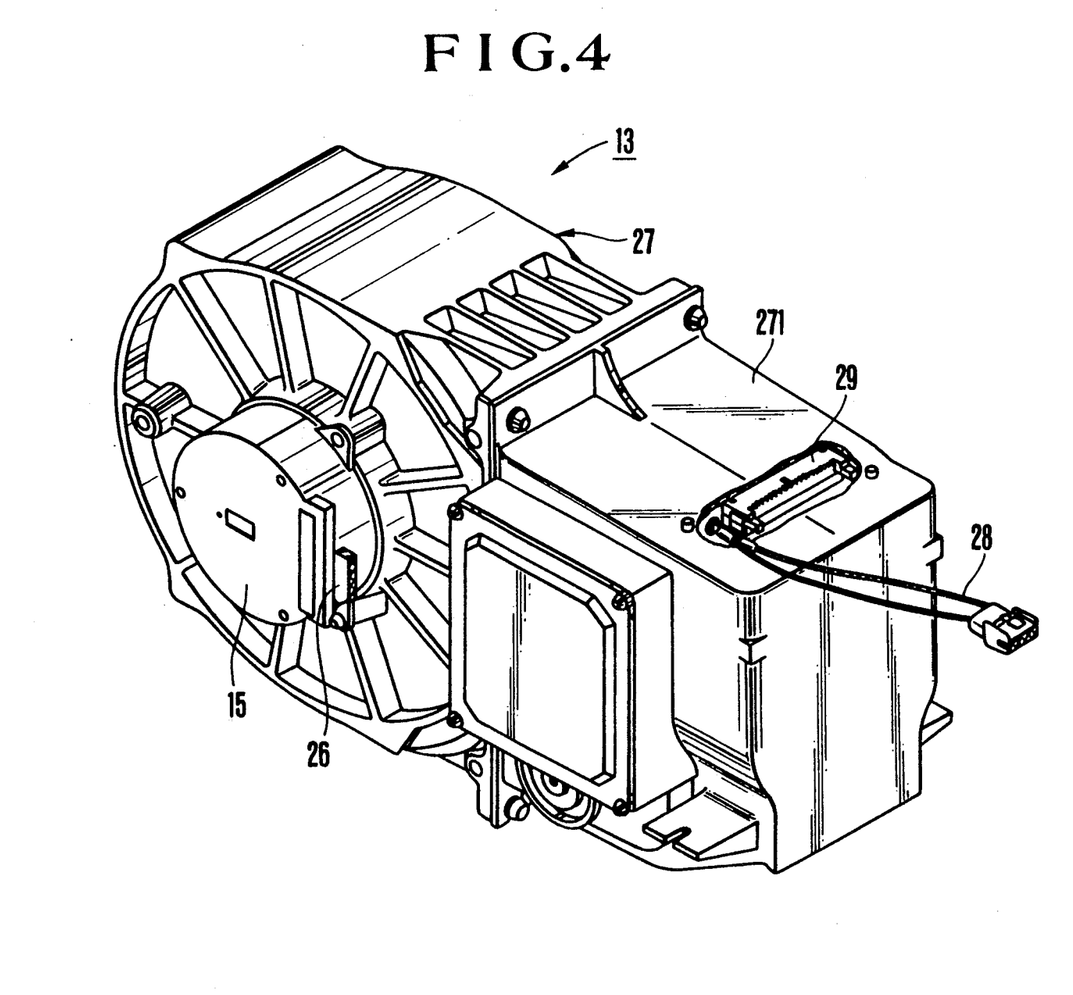
FIG. 4 is a perspective view of the HDA, showing the external appearance thereof.

FIG. 4 is a perspective view showing the external appearance of each HDA 13. The housing 27 accommodates therein the magnetic disks 16, the magnetic heads 18, the magnetic head drive means, etc., and several connectors are provided on the housing 27 so as to allow various signal lines and cables to extend from the HDA 13. Specifically, a motor cable connector 26 is provided on the bottom of the motor 15 to allow the driving of the motor 15. A VCM cable 28 for driving the voice-coil motor is provided on a cover 271 of the HDA 13, and an interface connector 29 is provided on the cover 271 of the HDA 13 to allow the transmission of signals read or to be written by the magnetic heads 18, and the transmission of signals pertaining to the operation of the HDA 13. These cables and the connectors are connected to PCBs, described below, on which various electronic circuit elements are mounted.

Figure 5:
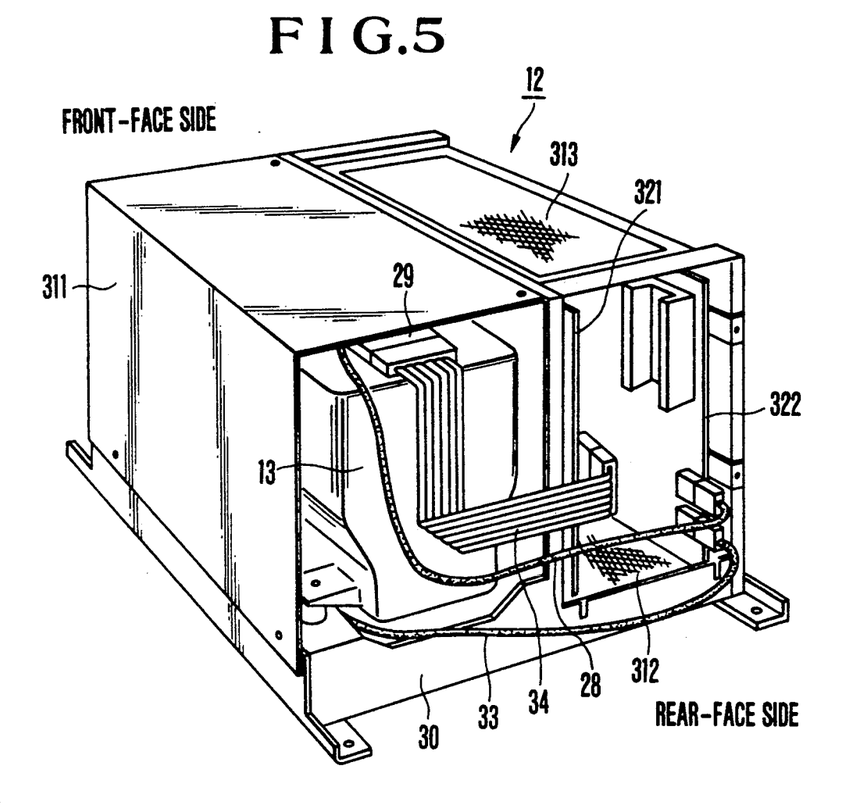
FIG. 5 is a perspective view of a head-disk unit (HDU), showing the external appearance thereof.

FIG. 5 is a perspective view showing the external appearance of each of the HDU 12. Each HDU 12 has a frame 30 formed of iron plates. Two chambers are formed above the frame 30, one chamber allowing the accommodation of the corresponding HDA 13, the other allowing the mounting of two printed circuit boards (PCBs) 321 and 322 on which various electronic circuit elements 32 (see FIG. 6) are mounted.

Figure 6:
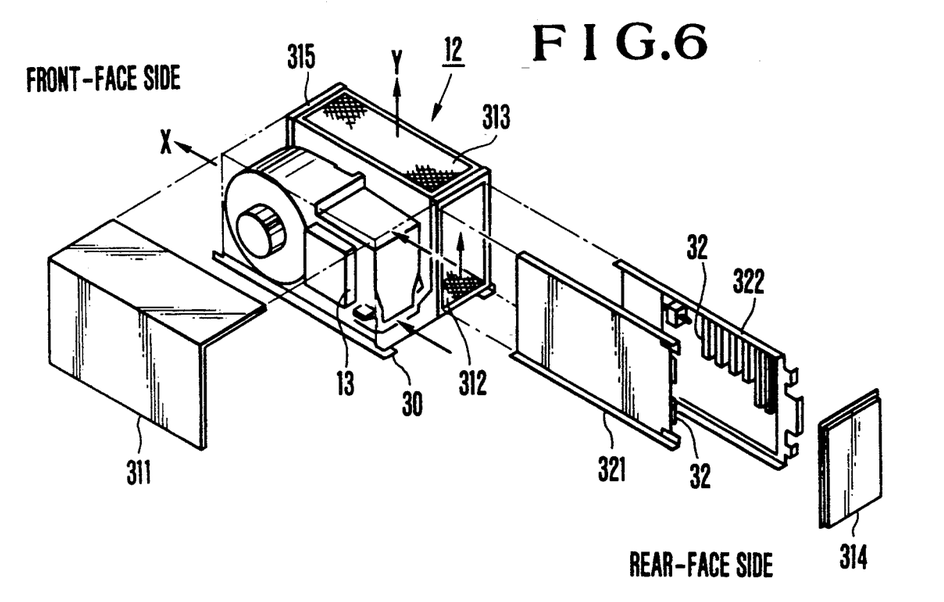
FIG. 6 is a partially exploded perspective view of the HDU, used to explain the flow of cooling air therethrough.

In the first chamber allowing the accommodation of the HDA 13, a cover 311 which is an integral member but corresponds to the upper face and an outer side face of the first chamber is mounted on the plate frame 30. A wall formed of an iron plate or the like is provided between the first chamber and the second chamber. The above-described members cooperate to define a tunnel-shaped space for accommodating the HDA 13. The HDA 13 is fixed to the frame 30 by screws extending through shock mounts (not shown) formed of rubber. As shown in FIG. 6, cooling air is sent through the inside of the tunnel-shaped first chamber from the side corresponding to the rear-face of the apparatus to the side corresponding to the front-face of the same (as indicated by arrows X in FIG. 6), thereby cooling the HDA 13.

In the second chamber allowing the mounting of the two PCBs 321 and 322, a cover formed of iron is mounted to form the outer side face of the second chamber. Further, wire gauges 312 and 313 are provided on the upper and lower sides of the second chamber. Still further, covers 314 and 315 (see FIG. 6) are mounted on those portions of the second chamber which correspond to the rear face and the front face of the apparatus, respectively. Certain consideration is given to the surfaces of the PCBs 321 and 322 inserted and accommodated in the second chamber. That is, the PCBs 321 and 322 are inserted in the second chamber in such a manner that those surfaces of the PCBs where circuits for writing and reading information as well as the electronic component parts 32 for controlling the motor 15 and the VCM are mounted, face each other. In this state, cooling air is sent through the wire gauges 312 and 313, then passes through the gap between the facing surfaces of the two PCBs 321 and 322 from below to above (i.e., in the direction indicated by arrows Y in FIG. 6). Air being sent in this manner cools the electronic components 32 on the surfaces of the PCBs 321 and 322.

Next, FIG. 5 will be again referred to, while descriptions will be given of a wiring structure allowing electrical connection to be established between the HDA 13 and the PCBs 321 and 322.

A motor cable 33 is connected, at one end thereof, to the above-described motor cable connector 26, with its other end connected to the PCB 322. One end of an interface cable 34 is connected to the above-described interface connector 29, with its other end connected to the PCB 321. A VCM cable 28 is connected to the PCB 322. The above-described cables enable the driving of the HDA 13, and the writing and reading of information. The electronic circuit elements on the PCBs 321 and 322 are supplied with power from the power source 101 or 102 through power supply cables, and they are connected to an external controller via interface cables (not shown).

Next, a cooling structure for the entire apparatus and ventilating action provided by the structure will be described with reference to FIGS. 7 to 9.

Figure 8:
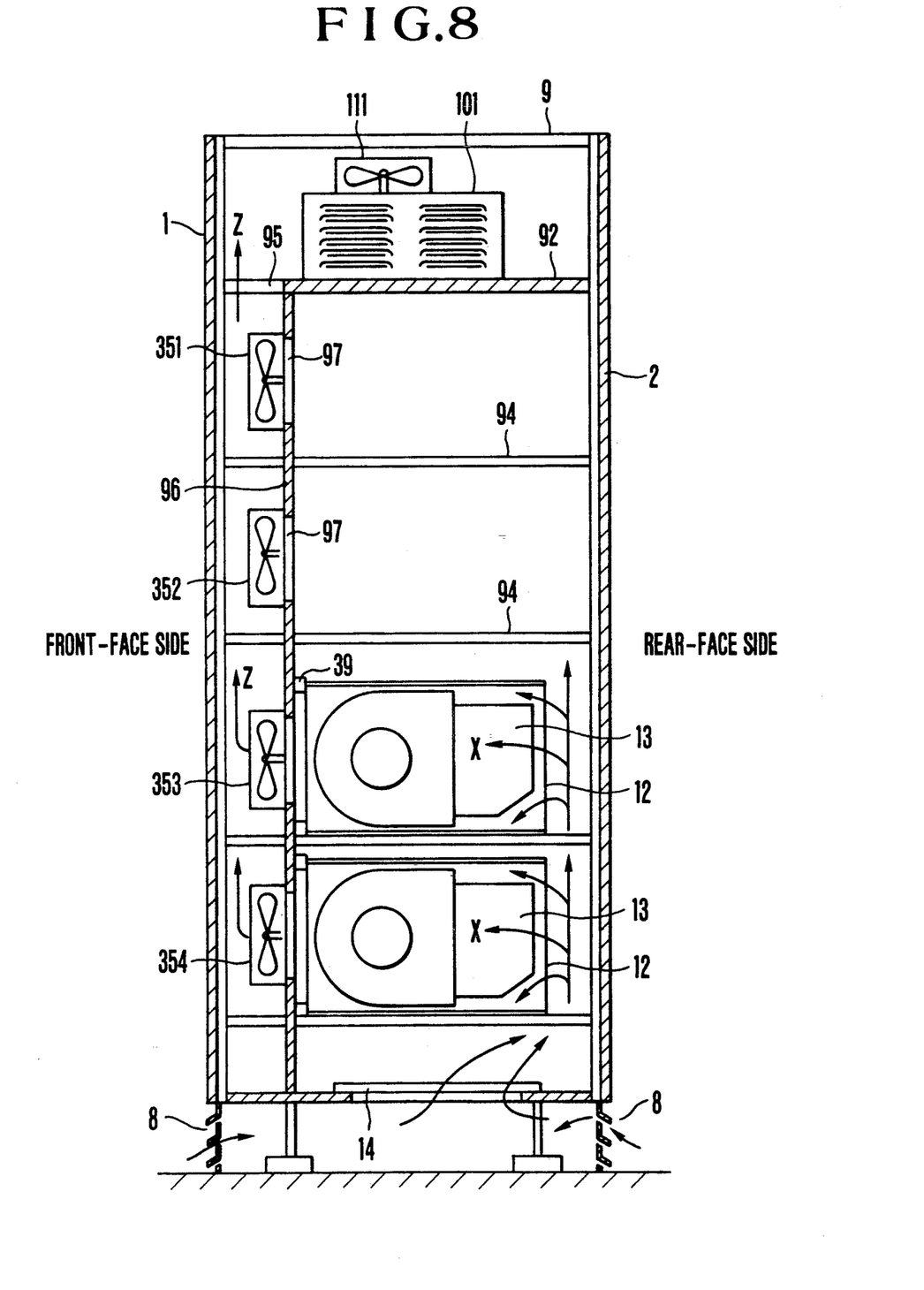
FIG. 8 is a vertical sectional view of the apparatus shown in FIG. 7, taken along the line VIII—VIII shown in FIG. 7.

FIG. 7 is an elevation taken from rear-face side of the magnetic disk apparatus, and FIG. 8 is a sectional view taken along the line VIII—VIII shown in FIG. 7.

The frame 9 allows five shelves to be formed therein. The uppermost shelf is formed by a partition wall 92 having ventilation holes 93 formed therethrough. The two power sources 101 and 102 are mounted upon the uppermost shelf. The reason why the power sources 101 and 102 are mounted on the uppermost shelf is that, if the power sources 101 and 102, which are the greatest source of heat in the apparatus, are mounted on the uppermost shelf, which is on the leeward side, this is advantageous to the enhancement of cooling efficiency.

The space within the frame 9 and below the wall 92 is partitioned by a wall 91 into a left side and a right side, and four-stage spaces allowing the accommodation of the HDUs 12 are provided by L-shaped metal members 94 which are fixed to the lateral frame members or to the wall 91, whereby shelves are formed. The HDUs 12, each being such as that shown in FIG. 5, are slid on the L-shaped metal members 94 and are then fixed thereto by screws.

In FIG. 7, the illustration of the covers 314 of the PCB-accommodating chambers of the HDUs 12 is omitted in order to facilitate the explanation of the flow of cooling air. As a result, the PCBs 321 and 322 are shown as exposed. Although the L-shaped metal members 94 fixed to the frame 9 allow eight HDUs 12 in total to be accommodated and fixed in place, the illustration of the two HDUs disposed on the upper left shelves is omitted in order to illustrate fans 351 and 352. In the vicinity of the vertical center of the frame 9, two fans 361 and 362 are provided. The position of each of these fans 361 and 362 corresponds to the position of the PCB-accommodating chambers of the left-side or right-side HDUs 12 arranged in four stages, and the fans 361 and 362 are interposed between those HDUs 12 on the two upper stages and those HDUs 12 on the two lower stages. When the fans 361 and 362 rotate, the following flow of air is caused: air is sucked through the filters 14 provided at the lower portion of the frame 9, passes through the gaps between the PCBs 321 and 322 of the HDUs 12 on the two lower stages, is further blown upward by the fans 361 and 362, passes through the gaps between the PCBs 321 and 322 of the HDUs 12 on the two upper stages, passes beside the power sources 101 and 102, and is then blown out to the space above the casing. This flow of air is indicated by arrows Y in FIG. 7. The electronic component parts mounted on the PCBs 321 and 322 of the HDUs 12, four HDUs 12 being mounted on each of the left and right sides, are cooled by ventilation effected in the Y direction, i.e., in the vertical or up-and-down direction.

Next, the cooling of the HDAs 13 will be described with reference to FIG. 8. An opening 95 for an air passageway is formed in a portion of a horizontal partition wall 92 provided below the power sources 101 and 102 (only the power source 101 is shown). Below the horizontal partition wall 92, a vertical partition wall 96 is provided in such a manner as to divide, in cooperation with the wall 92, the space within the frame 9 into two parts, one on the rear-face side, the other on the front-face side. A plurality of openings 97 are formed in portions of the vertical partition wall 96 which oppose the eight HDUs 12, and eight fans 351 to 358 (only four fans 351 to 354 are shown) are mounted on the front-face side surface of the wall 96. The vertical partition wall 96 carries packing members 39 which are fixed thereto and which come into close contact with the HDUs 12 when the HDUs 12 have been inserted into the corresponding space and mounted on the corresponding shelves of the frame 9.

When the fans 351 to 358 rotate, air is sucked through the filters 14 provided at the lower portion of the frame 9, and then flows in the direction indicated by arrows X in FIG. 8, as well as in the direction Y. Specifically, part of the sucked air flows from the right side of the HDUs 12 (as viewed in FIG. 8) into the tunnel-shaped first chambers enclosing the HDAs 13 of the HDUs 12, and is then blown upward (in the direction indicated by arrows Z in FIG. 8) by the rotation of the fans 351 to 358. In this way, each of the HDAs 13 is cooled by air flowing in the X direction, or in the horizontal direction. Because the space within the frame 9 is divided into two parts by the partition walls 92 and 96, and because the fans 351 to 358 are provided at positions between the divided parts, the following action is provided: part of low-temperature air introduced from a space below the frame 9 cools the eight HDAs 13. After the HDAs 13 have been individually and independently cooled, air at a high temperature flows without becoming mixed. It is therefore possible to cool the HDAs 13 efficiently.

Figure 9:
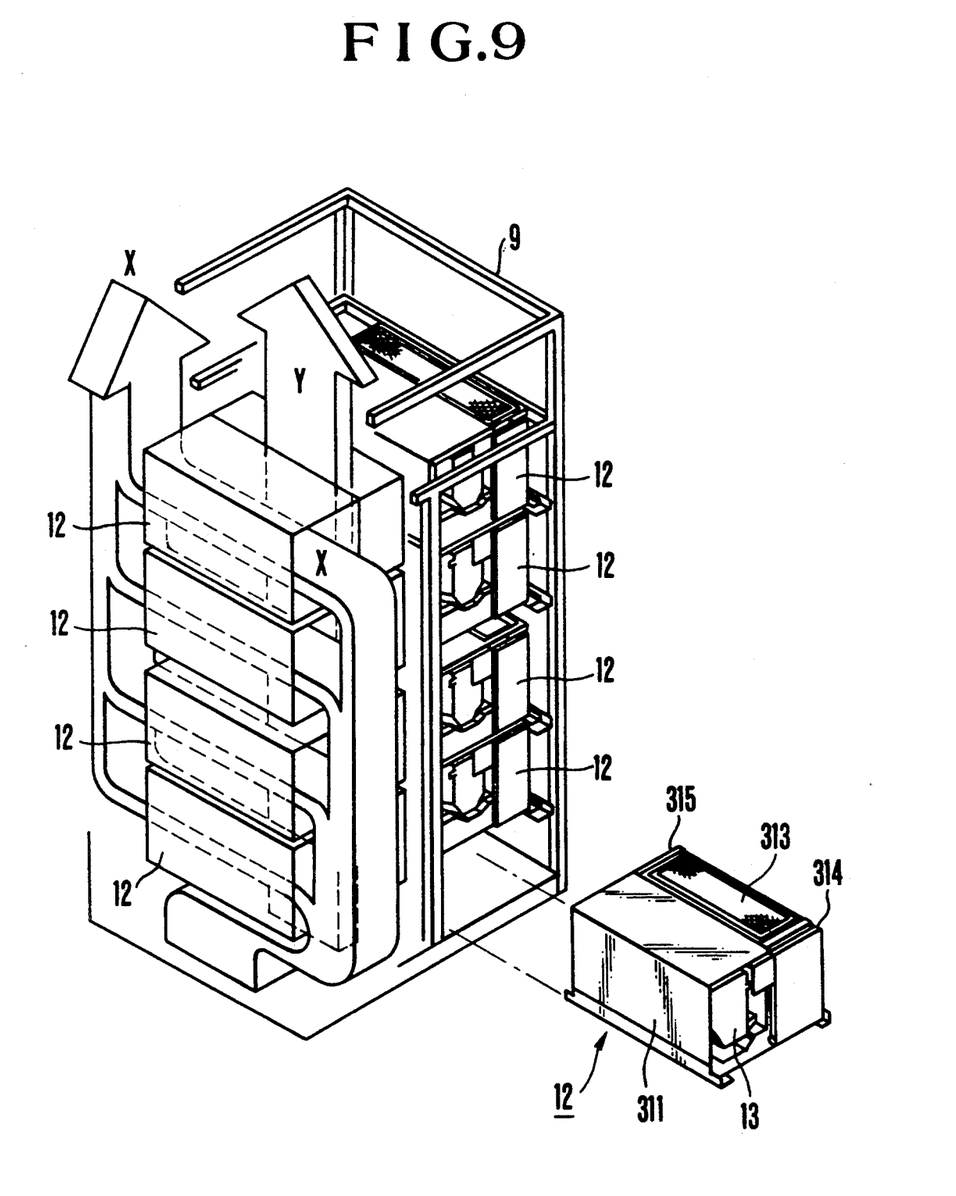
FIG. 9 is a perspective view used to explain the flow of cooling air through the entire magnetic disk apparatus.

FIG. 9 is a perspective view schematically showing the flow of air X for cooling the HDA 13 and the flow of air Y for cooling the PCBs, the HDAs 13 and the PCBs being mounted on the frame 9. As shown in the figure, air X for cooling the HDAs 13 flows from a space below the frame 9, branches off into the tunnel-shaped spaces (first chambers) of the HDUs 12, and flows horizontally in such a manner as to surround the HDAs 13, thereby cooling each of the HDAs 13. Thereafter, the branches of the air X join together and flow upward. On the other hand, air Y for cooling the PCBs flows from the space below the frame 9, this being the same as the air X, separates from the air X at positions below the lowermost HDUs 12, flows vertically and upwardly through the second chambers of the HDUs 12, thereby cooling the electronic component parts mounted on the PCBs of the HDUs 12, and further flows upward until it is discharged. In this way, a passageway which the flow of air for cooling the HDAs 13 follows and a passageway which the flow of air for cooling the PCBs follows are independently formed, thereby achieving an enhancement in the cooling efficiency.

The power sources 101 and 102 provided at the upper portion of the frame 9 are exposed to air X that already cooled the HDAs 13 and high-temperature air Y that already cooled the PCBs. However, since each of the power sources 101 and 102 is equipped with the fan 111 or 112, the power sources 101 and 102 are cooled by these fans 111 and 112. Although the power sources 101 and 102 are thus cooled by air at a relatively high temperature, this does not lead to any particular problem because the component parts of power sources have good temperature characteristics.

Although the foregoing description is concerned with the case where eight HDUs 12 are mounted on the frame 9, this is a mere example, and the present invention is not limited thereto. For instance, if four HDUs are mounted, with the frame 9 being provided with shelves in two stages, and two HDUs being mounted on each of the shelves, it is possible to expect a similar cooling effect to be achieved. Alternatively, if one of the right or left columns shown in FIG. 7 is omitted, with only four HDUs being vertically mounted, it is possible to expect a similar cooling effect.

Next, a wiring structure within a magnetic disk apparatus will be described with reference to FIGS. 10 and 11.

Figure 10:
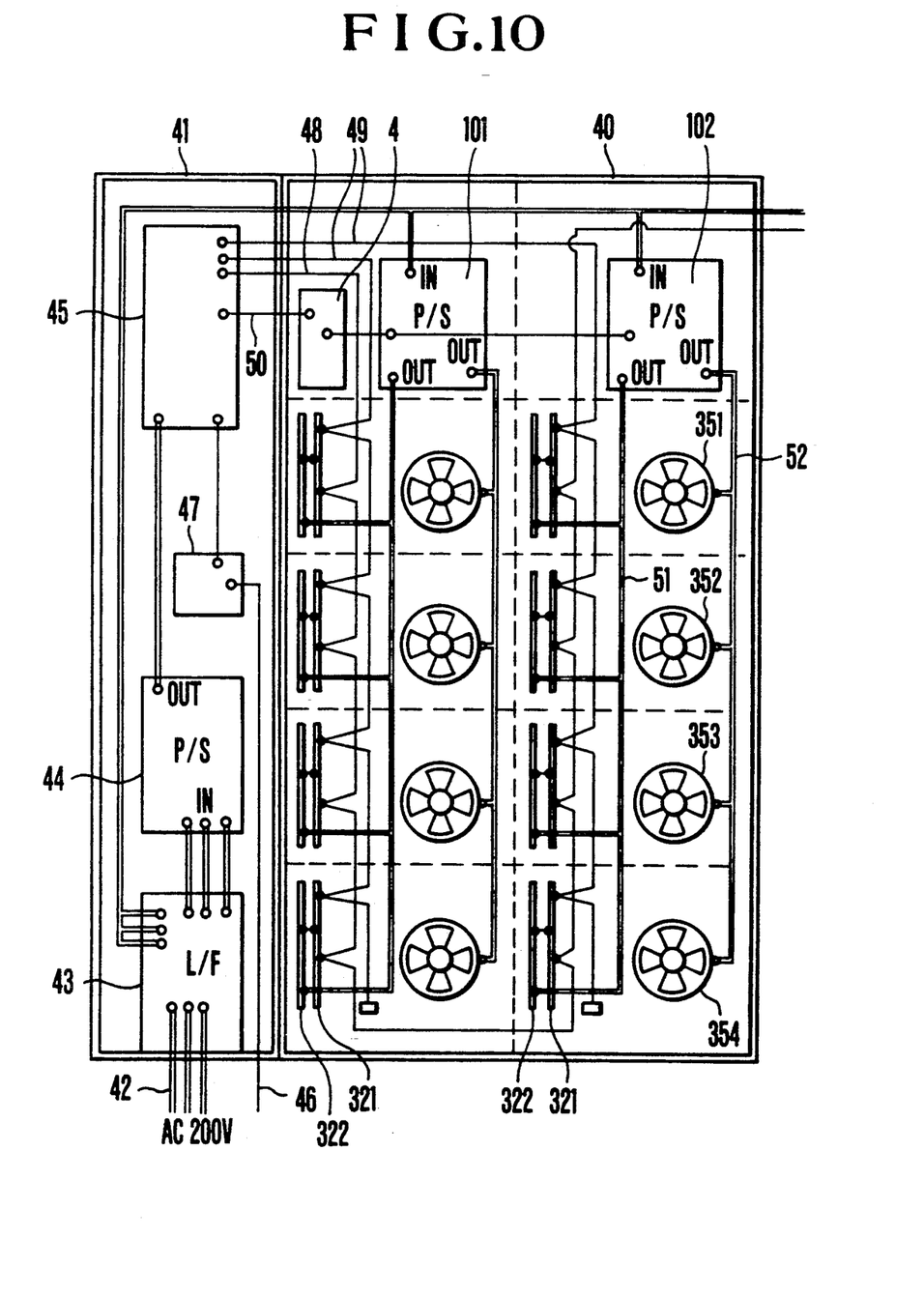
FIG. 10 is a view showing the arrangement of the main lines within a magnetic disk apparatus and a controller.

FIG. 10 shows the arrangement of the main lines of a magnetic disk apparatus 40 and a host apparatus, i.e., a controller 41. AC power cables 42 enter a lower portion of the controller 41 to be distributed to various parts within the controller 41, and are connected to a line filter 43. The power line branches off from the line filter 43, with one branch connected to a controller power source 44, the other extending to an upper portion of the controller 41 to be connected to the power sources 101 and 102 of the magnetic disk apparatus 40. The output of the controller power source 44 is connected to a controller electronic circuit section 45. In addition to the AC power cables 42, a controller interface cable 46 extending from a host apparatus of the controller 41 also enters a lower portion of the controller 41. The controller interface cable 46 is connected to a channel interface 47 and further to the controller electronic circuit section 45. Among various output lines from the controller electronic circuit section 45, a logical interface cable 48 and information signal cables 49 are each connected to the PCBs 321. These cables 48 and 49 are vertically extended and connected to the PCBs 321 of the HDUs 12 one after another from above to below. Another output line 50 from the controller electronic circuit 45 is connected via the operator control panel 4 to the power sources 101 and 102, so as to control these power sources. AC power input to the power sources 101 and 102 is shunted or converted into DC power within the power sources. Cables 51 and 52 extend vertically to allow the supply of the resultant power to the PCBs 322 of the HDUs, and to the eight fans 351 to 358, respectively. As described above, all the cables and the like extend in the vertical direction from above to below.

Figure 11:
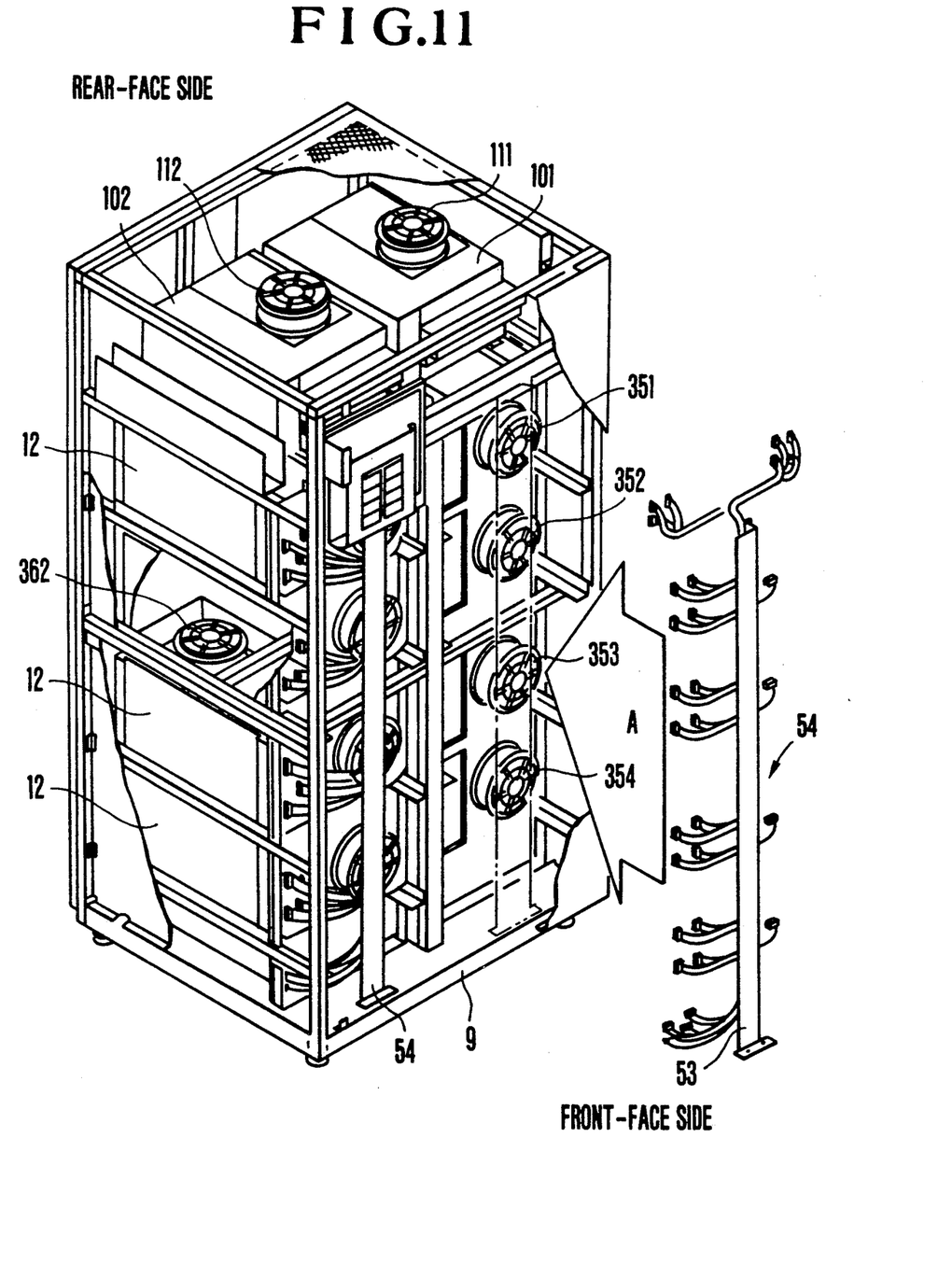
FIG. 11 is a perspective view showing the manner in which cable units are mounted on the magnetic disk apparatus.

FIG. 11 is a perspective view obliquely taken from the front-face side of the magnetic disk apparatus. All the cables for transmitting various signals and the power cables shown in FIG. 10 are bundled by L-shaped cable frames 53 to form two cable units 54. The two cable units 54 are inserted into the apparatus from the front-face side in the direction indicated by an arrow A, and are then fixed to the frame 9 by screws. Connectors at one of the respective ends of the cables forming the cable units 54 are connected to corresponding connectors of the PCB 321 and 322 and corresponding connectors of the fans 351 to 358, thereby achieving the arrangement showing in FIG. 10. As described above, the cables are mounted as assembled into two cable units 54, it is possible to facilitate wiring operations, while the risk of any errors occurring during wiring operations can be prevented as compared with the prior art.

As has been described above, according to the present invention, eight HDAs are each accommodated in a tunnel-shaped space allowing air to flow therethrough, and are cooled by high-speed air flows generated by cooling fans. Therefore, cooling efficiency is very high. For instance, in contrast with the prior art where the temperature of the HDAs increases by 25° C. relative to the external temperature, with the cooling structure of the present invention, it is possible to reduce the level of increase to 12° C. or below. By virtue of this reduction in the level of temperature increase, it is possible to improve the level of precision with which the heads within the HDAs are positioned. In addition, the PCBs 321 and 322 of the eight HDUs 12 can be cooled by the chimney-shaped vertical flow of air while only two fans are employed, thereby providing an inexpensive cooling structure. Furthermore, by virtue of the arrangement where the power sources are disposed on the uppermost portion of the magnetic disk apparatus, it is possible to vertically extend all the electrically connecting lines within the magnetic disk apparatus from above to below. This in turn makes it possible to assemble the lines into cable units, thereby making it possible to avoid the risk of any erroneous wiring.

The application of the present invention is not limited to the above-described magnetic disk apparatus, and may also be applied to an optical disk apparatus.

Thus, according to the invention, it is possible to arrange a plurality of head-disk units and at least one power source unit with enhanced levels of efficiency. Furthermore, printed circuit boards of the head-disk units on which electronic component parts are mounted and head-disk assemblies of the same can be independently cooled by different flows of air belonging to different air flow systems, thereby enabling a cooling structure to be simplified, and also enabling cooling efficiency to be enhanced. Still further, it is possible to simplify the arrangement of cables electrically connected to the units.

What is claimed is:

1. A disk apparatus comprising:
 a plurality of head disk units, each head disk unit comprising:

a housing have a front face and a rear face and having a top horizontal wall, a bottom horizontal wall, a right vertical side wall, a left vertical side wall and a central vertical wall forming a first chamber and a second chamber;

a disk;

a motor driving said disk into rotation;

a head recording information on and reproducing information from said disk;

head drive means for positioning said head on said disk;

a printed circuit board including electronic circuit elements for controlling said motor and said head drive means;

said first chamber accommodating said disk, said motor, said head and said head drive means;

said second chamber accommodating said printed circuit board;

a first air flow system causing cooling air to flow through said first chamber from said rear face of said housing to said front face of said housing; and a second air flow system causing cooling air to flow through said second chamber from said bottom wall to said top wall;

wherein said head-disk units are arranged in a stacked fashion in such a manner as to form a columnar arrangement with the first chambers of the head-disk units being collinear and with the second chambers of the head-disk units being collinear; and a power source for supplying power to said plurality of head-disk units, said power source being arranged to be mounted above said stacked head-disk units of said columnar arrangement and which is separated therefrom by a horizontal wall.

2. The disk apparatus of claim 1, wherein said second air flow system of each of said plurality of head disk units are arranged in such a manner as to form a common air flow system extending through the stack of head-disk units.

3. The disk apparatus of claim 2, further comprising:

a first group of fans, said first air flow system of each of said plurality of head-disk units including one fan of said first group of fans; and a second group of fans, said second group of fans being provided in said common air flow system.

* * * * *